(No Model.) 3 Sheets—Sheet 1.
C. E. LEEMAN & A. W. JONES.
ENGINEER'S VALVE FOR AIR BRAKES.
No. 437,607. Patented Sept. 30, 1890.
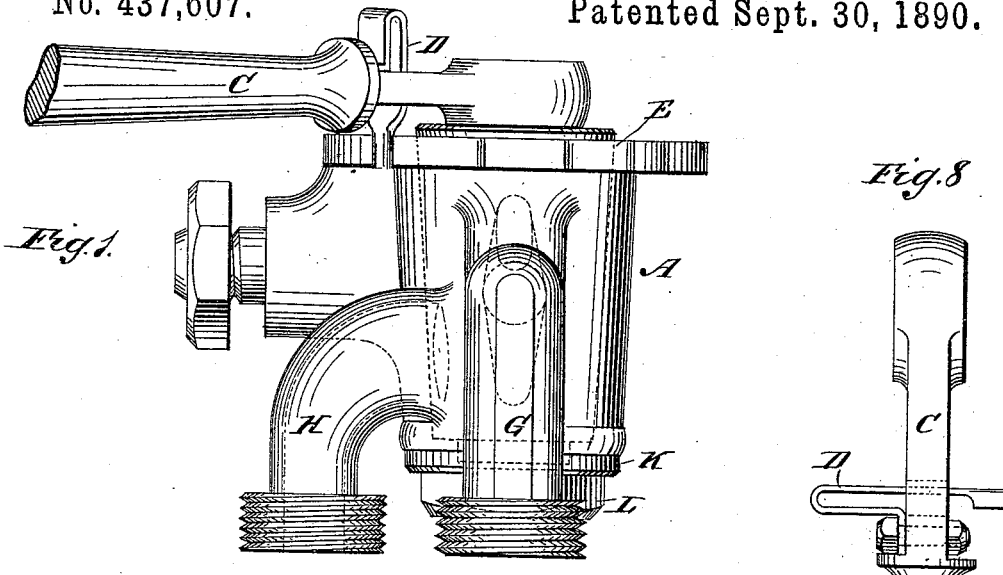
Fig. 1.
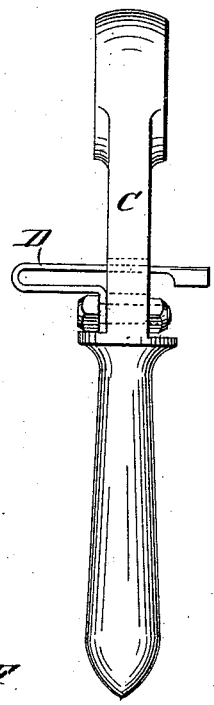
Fig. 8.
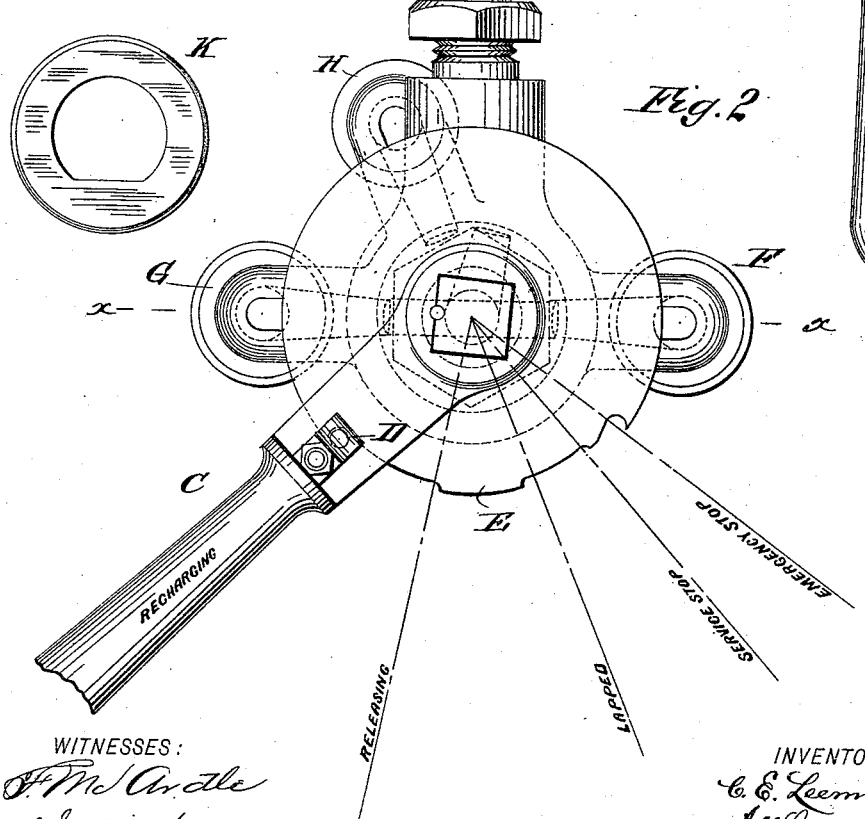
Fig. 9.
Fig. 2.
WITNESSES:
INVENTOR:
C. E. Leeman
A. W. Jones
BY
Munn & Co
ATTORNEYS.

(No Model.) 3 Sheets—Sheet 2.
C. E. LEEMAN & A. W. JONES.
ENGINEER'S VALVE FOR AIR BRAKES.
No. 437,607. Patented Sept. 30, 1890.
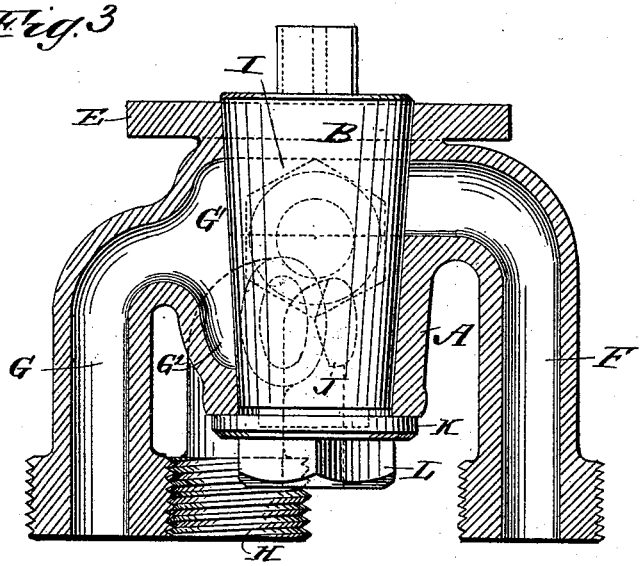
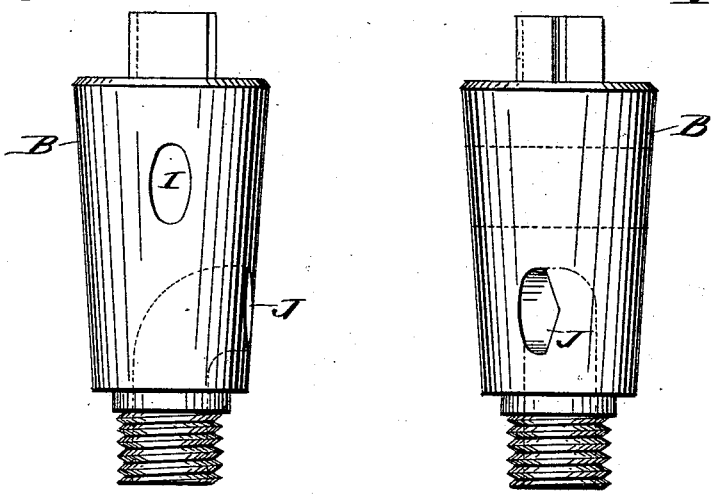
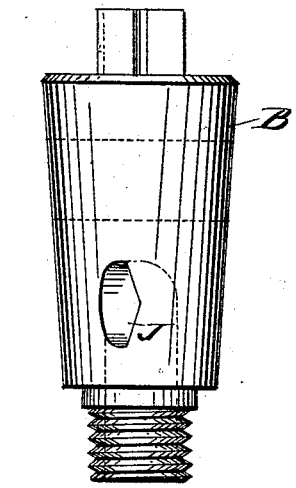
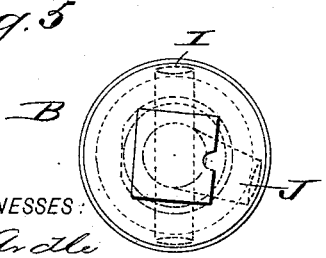
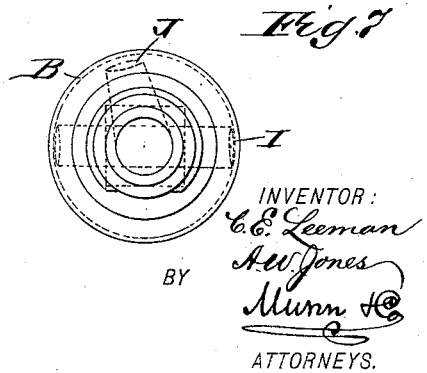

(No Model.) 3 Sheets—Sheet 3.
C. E. LEEMAN & A. W. JONES.
ENGINEER'S VALVE FOR AIR BRAKES.
No. 437,607. Patented Sept. 30, 1890.
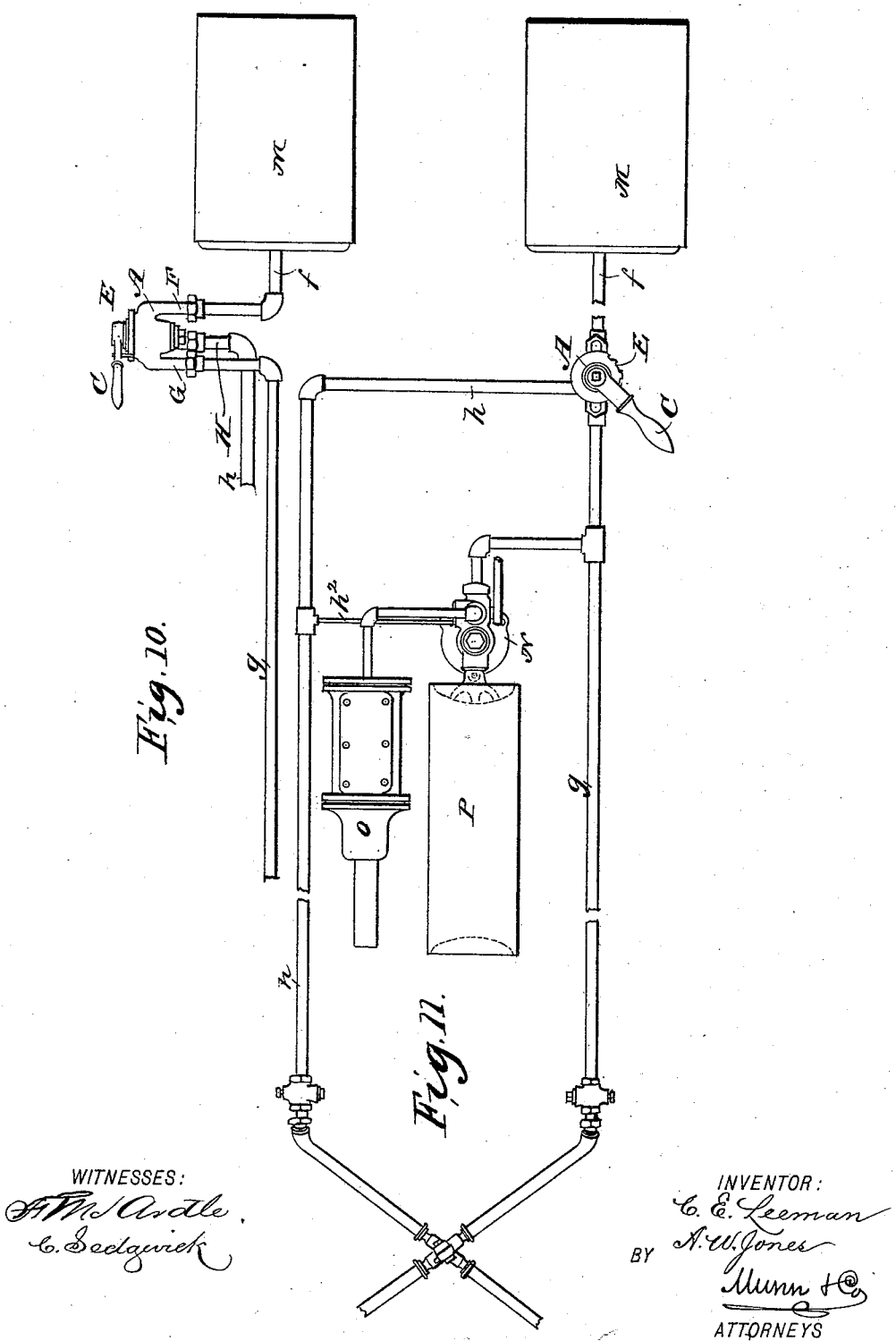
WITNESSES:
INVENTOR:
C. E. Leeman
A. W. Jones
BY
Munn & Co.
ATTORNEYS

UNITED STATES PATENT OFFICE.

CHARLES E. LEEMAN AND ALBERT W. JONES, OF SALIDA, COLORADO.

ENGINEER'S VALVE FOR AIR-BRAKES.

SPECIFICATION forming part of Letters Patent No. 437,607, dated September 30, 1890.

Application filed September 14, 1889. Serial No. 323,927. (No model.)

*To all whom it may concern:*

Be it known that we, CHARLES E. LEEMAN and ALBERT W. JONES, both of Salida, in the county of Chaffee and State of Colorado, have invented a new and Improved Engineer's Valve for Air-Brakes, of which the following is a full, clear, and exact description.

The object of the invention is to provide a new and improved engineer's valve adapted for automatic air-brakes, allowing the recharging of the auxiliary reservoir under each car without releasing the brakes, and adapted to regulate the force of the brakes by releasing or reapplying at any time without fully releasing.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a side elevation of the improvement. Fig. 2 is a plan view of the same. Fig. 3 is a sectional side elevation of the same on the line $x\ x$ of Fig. 2. Fig. 4 is a side elevation of the valve-plug. Fig. 5 is a plan view of the same. Fig. 6 is a side elevation of the same in a different position. Fig. 7 is an inverted plan view of the same. Fig. 8 is a side elevation of the valve-handle. Fig. 9 is a face view of the plug-washer. Fig. 10 is a side elevation of the improvement and the main reservoir, and Fig. 11 is a plan view of the Westinghouse system with our improvement applied thereto.

The improved engineer's valve is provided with the valve-body A, in which is fitted to turn the plug B, connected at its upper end with the handle C for conveniently turning the plug. On the handle C is arranged the usual spring D, adapted to engage various notches arranged in the periphery of the plate E on the top of the valve-body A. The notches are indicated in Fig. 2, four of them being the usual ones, with the addition of a fifth one marked "recharging."

The valve-body A is provided with a pipe F, connected by pipe *f* with the main reservoir M, also provided with a pipe G, connected with the train-pipe *g*, and with a third pipe H, connected with the train-pipe *h*, which is connected with the exhaust-opening of the triple valve N. O is the cylinder- and P is the auxiliary reservoir. In the valve-plug B is arranged a transversely-extending opening I, adapted to connect the inner end of the pipe F with the upper end G' of the pipe G. In the plug B is also arranged an opening J, which leads from one side of the plug to the center and through the same to its lower end to the outside. The opening J is preferably of the shape shown in Fig. 6— that is, one side is angular while the other side is curved, so that the angular side in moving over an opening gradually permits the air to escape, so as to prevent all jerks in applying the brakes. The opening J is adapted to register with the pipe H, connected with the triple valve, and also adapted to register with the lower part $G^2$, forming an extension of the upper part G' of the pipe G. The valve-plug B is held in place in the valve-body A by the usual washer K and the nut L, screwing on the lower threaded end of the said plug.

The operation is as follows: When the operator desires to recharge the auxiliary reservoir, he moves the lever C into the position shown in Figs. 2 and 10, so that the opening J is disconnected from the pipe H, while the opening I in the plug B connects the pipes F and G. The air from the main reservoir can now pass through the pipe F, the opening I in the plug B, through the pipe G into the train-pipe, and from the latter in the usual manner to the auxiliary reservoir. When the operator desires to release the brakes, he moves the handle C to the second position, (marked "releasing,") so that the opening J registers with the pipe H, and air is permitted to escape from the triple valve—that is, from the brake-cylinder. When the operator desires to apply the brakes, he moves the handle C to the position indicated "service-stop," whereby the opening J is connected with the lower part $G^2$ of the pipe G, so that air can escape from the train-pipe, whereby the brakes are applied in the usual manner. When the operator now desires to recharge the auxiliary reservoir under each car without releasing the brakes, he moves the handle C to the recharging position, (shown in Fig. 2,) so that the pipes F and G are connected with each other and air from the main reservoir can again pass to the auxiliary reservoir. By this return movement from the service-stop to recharging the opening J passes rapidly over the inner end of the pipe H, so that very little, if any, air can escape from the side of the pipe H. Thus it will be seen that the force of the brakes can also be regulated by releasing or reapplying at any time without fully releasing, so that the valve is especially useful on heavy mountain grades.

By the use of this engineer's valve the control of the brakes and train is placed entirely in the hands of the engineer, whereas with the present appliances ten or fifteen pound pressure valves on each car place the control in the hands of several men, thereby reducing the safety of the train. With this appliance a small or a great amount of pressure can be applied to the brakes of each car, as the case may require, during the recharging of the auxiliary reservoir, while with pressure-valves as now used fifteen pounds only can be retained, and then the valves have to be adjusted by the trainmen, over which the engineer has no control. It will be further understood that the shape of the opening J in the valve-plug B is of importance, as it permits of applying the brakes gradually, thereby preventing jerking of the train. By maintaining a uniform pressure on the brakes there is less liability of an accident occurring by sliding wheels, &c.

Having thus described our invention, what we claim as new, and desire to secure by Letters Patent, is—

1. In an air-brake, an engineer's valve connected with the main reservoir and with the exhaust-opening of the triple valve and constructed to establish a communication between the main reservoir and the auxiliary reservoir through the triple valve to permit the auxiliary reservoir to be recharged while the brakes are applied, substantially as described.

2. In an air-brake, the combination, with the main air-reservoir, the auxiliary reservoir, the triple valve, the train-pipes, and connections between the train pipes and the inlet and exhaust ports of the triple valve, of an engineer's valve comprising a valve-body connected with the train-pipes and main reservoir and a plug fitting in the body and provided with a transverse opening and an opening leading from one side through the lower end of the same, substantially as and for the purpose set forth.

3. In an engineer's valve, the valve-body A, provided with the opposite pipes F G, adapted to be connected with the main air-reservoir and the train-pipe, respectively, the pipe G being provided with the extension $G^2$, said valve-body also provided with the pipe H between the pipes F G, adapted to be connected with the exhaust-opening of the triple valve, and the plug B, fitting in the body and provided with the transverse opening I and with the opening J, leading from one side through the lower end of the same and having one angular side, substantially as herein shown and described.

CHARLES E. LEEMAN.
ALBERT W. JONES.

Witnesses:
WM. W. ROLLER,
A. R. ROSE.